(12) United States Patent
Samejima et al.

(10) Patent No.: US 9,891,119 B2
(45) Date of Patent: Feb. 13, 2018

(54) SENSOR, STRAIN SENSOR, AND PRESSURE SENSOR

(71) Applicant: YOKOGAWA ELECTRIC CORPORATION, Musashino-shi, Tokyo (JP)

(72) Inventors: Takeru Samejima, Tokyo (JP); Nobuyuki Hamamatsu, Tokyo (JP); Takashi Yoshida, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 14/842,273

(22) Filed: Sep. 1, 2015

(65) Prior Publication Data
US 2016/0069755 A1    Mar. 10, 2016

(30) Foreign Application Priority Data
Sep. 4, 2014 (JP) .................................. 2014-180175

(51) Int. Cl.
*G01B 7/16* (2006.01)
*G01L 1/18* (2006.01)
*G01L 19/04* (2006.01)
*G01L 1/26* (2006.01)
*G01D 11/30* (2006.01)
*G01L 19/00* (2006.01)

(52) U.S. Cl.
CPC .............. *G01L 1/18* (2013.01); *G01D 11/30* (2013.01); *G01L 1/26* (2013.01); *G01L 19/0092* (2013.01); *G01L 19/04* (2013.01)

(58) Field of Classification Search
CPC ......... G01L 1/18; G01L 1/26; G01L 19/0092; G01L 19/04; G01D 11/30

USPC ............................................. 73/760, 777, 856
See application file for complete search history.

(56) References Cited

U.S. PATENT DOCUMENTS

| 3,102,420 A | 9/1963 | Mason | |
| 6,446,507 B2 * | 9/2002 | Ueyanagi | G01P 1/023 |
| | | | 73/514.36 |
| 8,297,110 B2 * | 10/2012 | Djakov | G01N 9/002 |
| | | | 73/54.24 |
| 8,313,236 B2 * | 11/2012 | Barth | G01N 27/18 |
| | | | 374/10 |

(Continued)

FOREIGN PATENT DOCUMENTS

| JP | 59176639 A | 10/1984 |
| JP | 04290938 A | 10/1992 |

(Continued)

OTHER PUBLICATIONS

"Example of bonding method and moisture-proof processing of strain gauge" online, searched on Aug. 12, 2014, <http://www.kyowa-ei.com/jpn /technical /notes/bonding_procedure/index.html>.

*Primary Examiner* — Max Noori
(74) *Attorney, Agent, or Firm* — Sughrue Mion, PLLC

(57) ABSTRACT

A sensor includes a first structure that is attachable to a measurement specimen, a second structure that is made of material which is smaller in thermal expansion coefficient than the first structure, a bottom surface of the second structure being connected to the first structure, and a detector that is connected to an upper surface of the second structure, the detector being configured to detect a deformation of the second structure.

18 Claims, 12 Drawing Sheets

(56) References Cited

U.S. PATENT DOCUMENTS

| | | | | |
|---|---|---|---|---|
| 8,393,222 B2* | 3/2013 | Crivelli | ................. | G01L 9/0052 |
| | | | | 361/283.4 |
| 9,035,253 B2* | 5/2015 | Noda | ........................ | G01J 5/34 |
| | | | | 250/338.3 |
| 9,267,846 B2* | 2/2016 | Kondo | .................... | H01L 37/02 |
| 2005/0172723 A1 | 8/2005 | Kato et al. | | |

FOREIGN PATENT DOCUMENTS

| | | |
|---|---|---|
| JP | 2009264976 A | 11/2009 |
| JP | 4511844 B2 | 7/2010 |
| WO | 02/35178 A1 | 5/2002 |

* cited by examiner

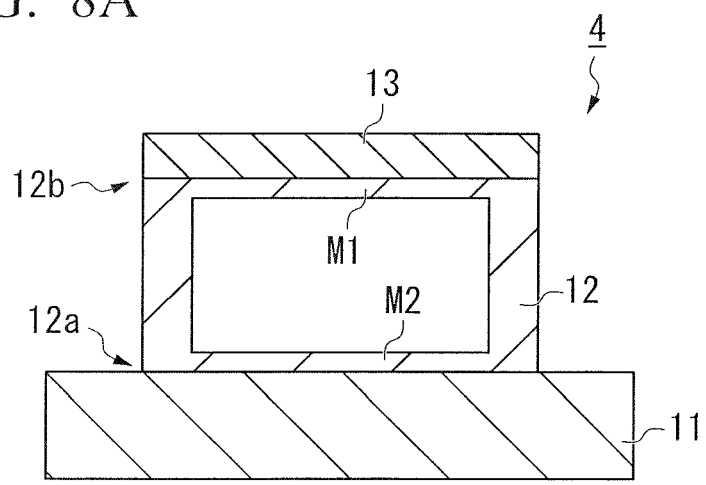
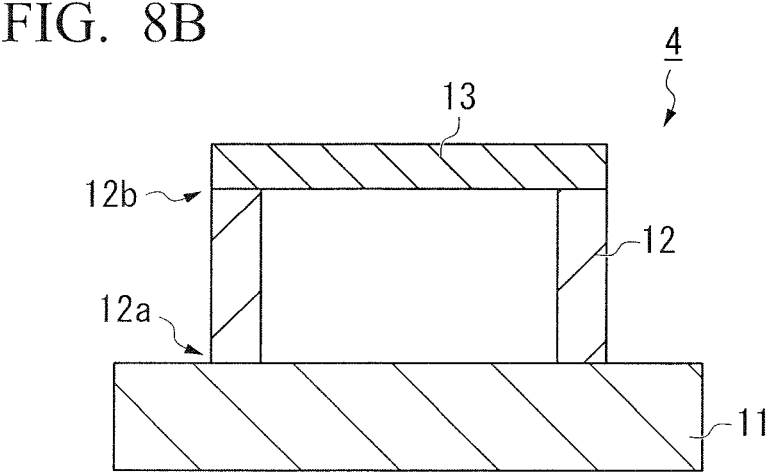

SENSOR, STRAIN SENSOR, AND PRESSURE SENSOR

BACKGROUND OF THE INVENTION

Field of the Invention

The disclosure relates to a sensor, a strain sensor, and a pressure sensor.

Priority is claimed on Japanese Patent Application No. 2014-180175, filed Sep. 4, 2014, the contents of which are incorporated herein by reference.

Description of Related Art

Strain gauge is a typical example of a sensor which measures strain of a measurement specimen. The strain gauge is roughly classified into a metal strain gauge and a semiconductor strain gauge. The metal strain gauge is a strain gauge which has a metal foil which is an isotopic conductor, a thin wire, and so on. The semiconductor strain gauge is a strain gauge which utilizes piezo resistance effect of semiconductor (effect of changing electrical resistivity of semiconductor by stress). Additionally, there is a resonant strain gauge in which a resonator is formed on a semiconductor wafer by a MEMS (Micro Electro Mechanical Systems) technology. The resonant strain gauge has the resonator, a supporter which fixes both ends of the resonator, and a substrate for adding strain to the supporter. Resonant frequency of the resonator is changed by the strain of the supporter. The resonant strain gauge detects the strain by detecting the change of the resonant frequency of the resonator.

Gauge factor of the metal strain gauge is about more than 1 and about 10. On the other hand, gauge factor of the semiconductor strain gauge is about 100, and gauge factor of the resonant strain gauge is about 1000. The semiconductor strain gauge is higher in sensitivity of strain than the metal strain gauge, and the resonant strain gauge is further higher in sensitivity of strain. Therefore, in a case of measuring fine strain, the semiconductor strain gauge is used more often than the metal strain gauge. In a case that strain of measurement specimen is generated by pressure applied to the measurement specimen, the strain gauge is also used so as to measure the pressure applied to the measurement specimen.

For example, the metal strain gauge is used in a state of being attached to the measurement specimen with an organic adhesive such as polyimide. Because a temperature error of the metal strain gauge is caused by a difference between a thermal expansion coefficient of the isotopic conductor, which is used in the metal strain gauge, and a thermal expansion coefficient of the measurement specimen, the metal strain gauge of which thermal expansion coefficient approximates to the thermal expansion coefficient of the measurement specimen is used so as to decrease the temperature error.

In WO 2002/035178, an example of a semiconductor strain gauge is disclosed. In Japanese Patent No. 4511844, an example of measuring pressure applied to a measurement specimen by using a strain gauge is disclosed. In "EXAMPLE OF BONDING METHOD AND MOISTURE-PROOF PROCESSING OF STRAIN GAUGE, [online], [searched on Aug. 12, 2014], Internet<http://www.kyowa-ei.com/jpn/technical/notes/bonding_procedure/index.html>, a specific adhering method for adhering a strain gauge to a measurement specimen is disclosed.

As described above, in a case that the metal strain gauge is attached to the measurement specimen with the organic adhesive such as polyimide, a stress is applied to the organic adhesive by a difference between a thermal expansion coefficient of the metal strain gauge and a thermal expansion coefficient of the measurement specimen. Therefore, if temperature is repeatedly changed and stress is repeatedly applied to the organic adhesive, there is a problem that displacement and release of an adhesive interface easily occur, and drift and hysteresis occur. Recently, a long-term use of several decades of a strain gauge is required. However, because the drift and the hysteresis significantly worsen a measurement result of the metal strain gauge which is used in a long-term, there is a need to form the structure without using any adhesive.

On the other hand, so as to measure with high accuracy, there is a problem as follows. A case that the measurement specimen is made of steel or concrete will be described in detail. So as to measure a fine strain generated in steel and concrete in high accuracy, it is thought that the semiconductor strain gauge which is higher in strain sensitivity than the metal strain gauge is used. However, because a difference between a thermal expansion coefficient of the semiconductor strain gauge and a thermal expansion coefficient of steel and concrete is large, a temperature error is large. Therefore, there is a problem that a fine strain generated in steel and concrete cannot be measured in high accuracy.

SUMMARY

A sensor may include a first structure that is attachable to a measurement specimen, a second structure that is made of a material which is smaller in thermal expansion coefficient than the first structure, a bottom surface of the second structure being connected to the first structure, and a detecting element that is connected to an upper surface of the second structure, the detecting element being configured to detect a deformation of the second structure.

Further features and aspects of the present disclosure will become apparent from the following detailed description of exemplary embodiments with reference to the attached drawings.

BRIEF DESCRIPTION OF THE DRAWINGS

FIG. 8A is a sectional view illustrating a main configuration of a sensor in the fourth embodiment.

FIG. 8B is a sectional view illustrating a main configuration of a sensor in the fourth embodiment.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of some embodiments of the present invention is to provide a sensor, a strain sensor, and a pressure sensor which can suppress the drift and the hysteresis and can measure in high accuracy.

The sensor, the strain sensor, and the pressure sensor of the present embodiment will be described in detail below with reference to drawings. In drawings described hereinbelow, so as to easily understand, each member is illustrated with a size of the each member changed as needed.

First Embodiment

Figure 1A:
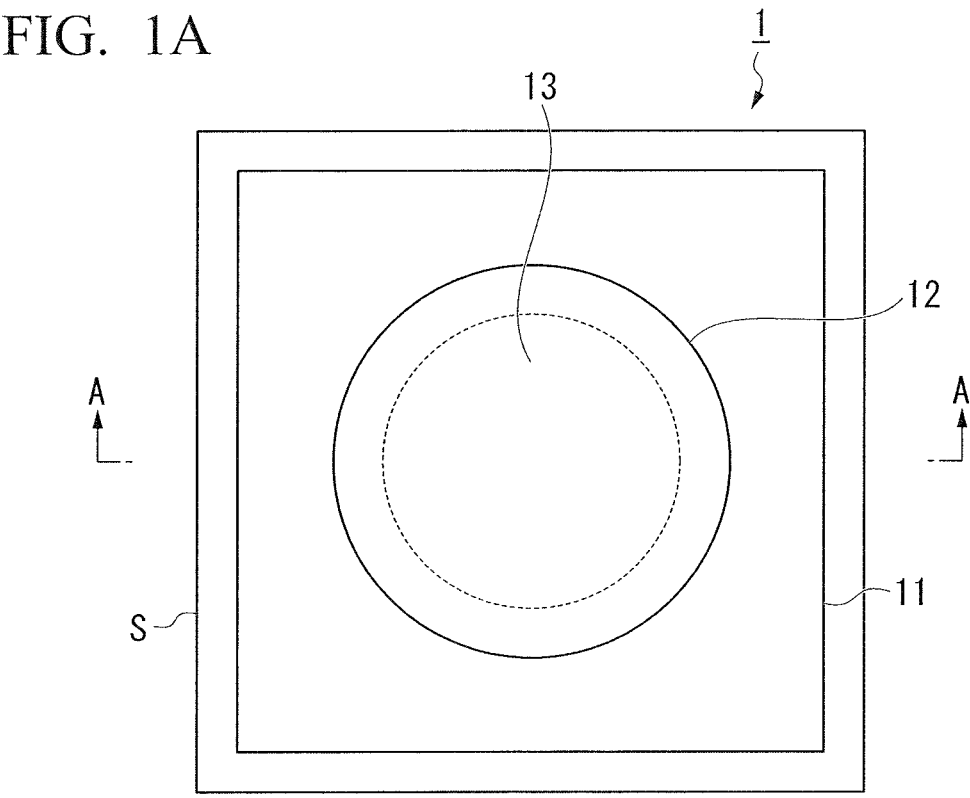
FIG. 1A is a plan view of a sensor in a first embodiment.
Figure 1B:
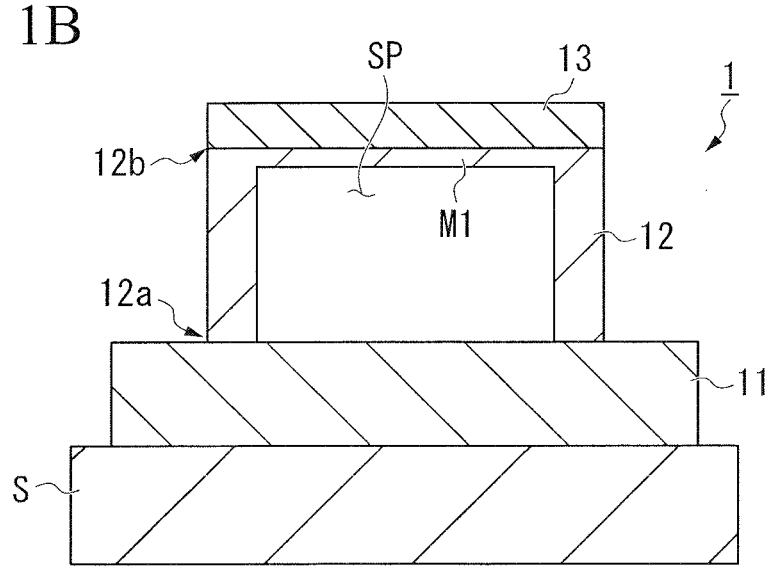
FIG. 1B is a sectional view on the line A-A.

FIG. 1A is a plan view of a sensor in a first embodiment. FIG. 1B is a sectional view on the line A-A. As shown in FIG. 1A and FIG. 1B, the sensor 1 in the present embodiment has a substrate 11 (a first structure), an intermediate structure 12 (a second structure), and a strain detecting element 13 (a detector). The sensor 11 is attached to a measurement specimen S, and the sensor 11 measures a strain of the measurement specimen S. In the present embodiment, for example, the measurement specimen S is made of SUS (Steel Use Stainless).

The first structure 11 is a member of which plan-view shape is rectangular shape. The first structure 11 is attached to the measurement specimen S, and the first structure 11 fixes the sensor 1 to the measurement specimen S. As with the measurement specimen S, the first structure 11 is made of SUS (Steel Use Stainless). In other words, the first structure 11 is made of material which is the same (approximately the same) in thermal expansion coefficient as the measurement specimen S. A whole surface (bottom surface) of the first structure 11, which is in contact with the measurement specimen S, is joined to the measurement specimen S. This is to prevent friction which causes the hysteresis from being generated between the first structure 11 and the measurement specimen S. Specifically, the first structure 11 is joined to the measurement specimen S by welding, thermal compression bonding, or the like.

The second structure 12 is a member to be a bottomed cylindrical shape. The second structure 12 is disposed so that the drift and the hysteresis can be suppressed, a difference in thermal expansion coefficient between the measurement specimen S and the strain detecting element 13 can be decreased, and a fine strain can be measured in high accuracy. The second structure 12 is made of material which is smaller in a thermal expansion coefficient than the first structure 11. For example, the second structure 12 is made of ceramics such as alumina ($Al_2O_3$), aluminum nitride (AlN), silicon carbide (SiC), sialon (SiAlON), silicon nitride ($Si_3N_4$).

An end part 12a (a bottom surface) of the second structure 12 which has no bottom is connected to an upper surface of the structure 11. As a connection between the first structure 11 and the second structure 12, brazing, inorganic adhesive, glass frit bonding, SOG (Spin On Glass) wafer bonding, and welding can be used. An internal diameter of the second structure 12 is about several millimeters, and a thickness of an upper surface membrane M1 formed in an end part 12b is about several hundred micrometers. In the present embodiment, the internal diameter of the second structure 12 is 4 [mm], and the thickness of an upper surface membrane M1 is about 0.2 [mm] (=200 [μm]).

The second structure 12 has an end part 12b (an upper surface) which has a bottom. Although details will be described later, the shape of the second structure 12 (height h and width w of a sidewall) is designed so that a strain (deformation) of the end part 12b, which is generated by thermal expansions of the first structure 11, the second structure 12, and the strain detecting element 13, is made to be a predetermined value (for example, zero). This is to make the temperature error, which is caused by the difference in thermal expansion coefficient between the measurement specimen S and the strain detecting element 13, as small as possible.

The strain detecting element 13 has a resonant strain gauge (a resonant strain sensor: for example, two resonant strain gauges measuring strains in directions perpendicular to each other within a plane of the upper surface membrane M1 of the second structure 12). The strain detecting element 13 detects the strain of the end part 12b of the second structure 12, which is generated by the strain of the measurement specimen S. The strain (deformation) of the end part 12b of the second structure 12 is caused by a difference in thermal expansion coefficient between the first structure 11 and the second structure 12. The strain detecting element 13 is connected to the upper surface membrane M1 which is formed in the end part 12b of the second structure 12. As the connection between the strain detecting element 13 and the upper surface membrane M1, inorganic adhesive, glass fit bonding, SOG wafer bonding, anodic bonding, metal diffusion bonding, and surface activated room temperature bonding can be used. In the present embodiment, a thickness of the strain detecting element 13 is 0.1 [mm].

Next, a design method of the shape of the second structure 12 (height h and width w of a sidewall) will be described. As described above, the shape of the second structure 12 is designed so that a strain of the end part 12b of the second structure 12, which is generated by thermal expansions of the first structure 11, the second structure 12, and the strain detecting element 13, is made to be zero (or as small as possible). In other words, the shape of the second structure 12 is designed so that the strain generated by a temperature change in the end part 12b of the second structure 12 can be compensated.

Figure 2A:
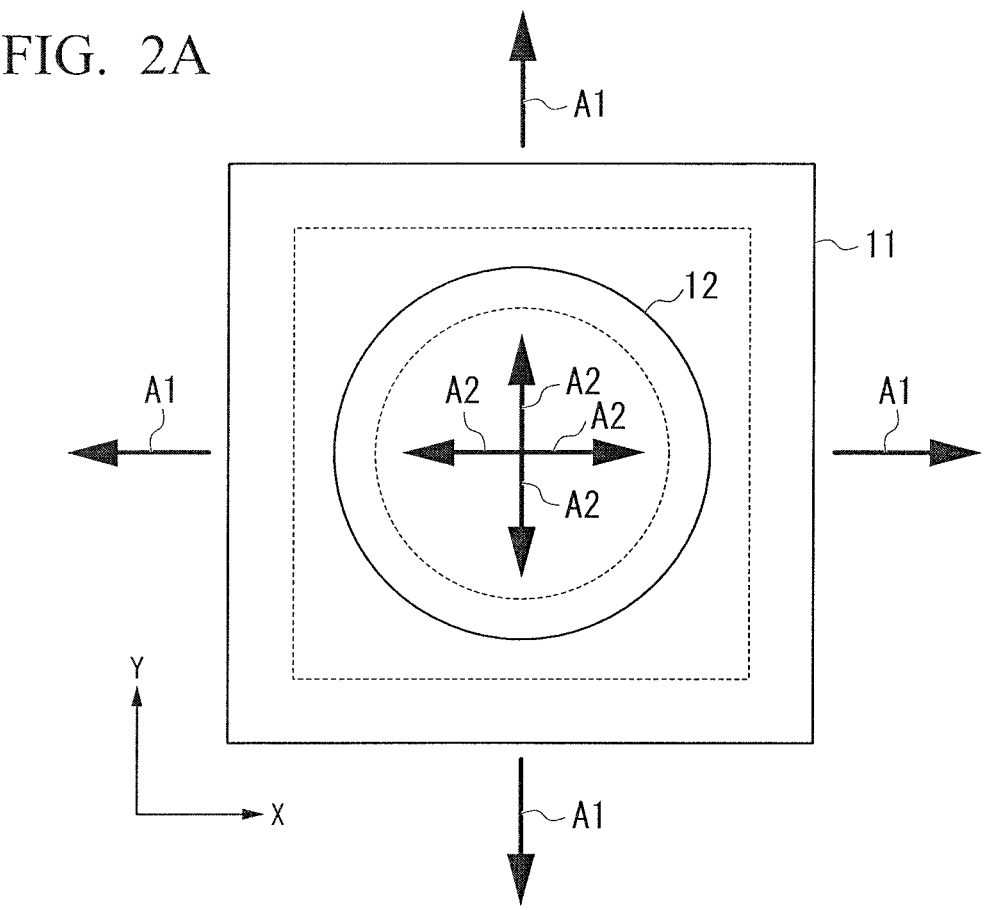
FIG. 2A is a plan view of the sensor in a first embodiment for describing the strain generated when the temperature of the sensor increases.
Figure 2B:
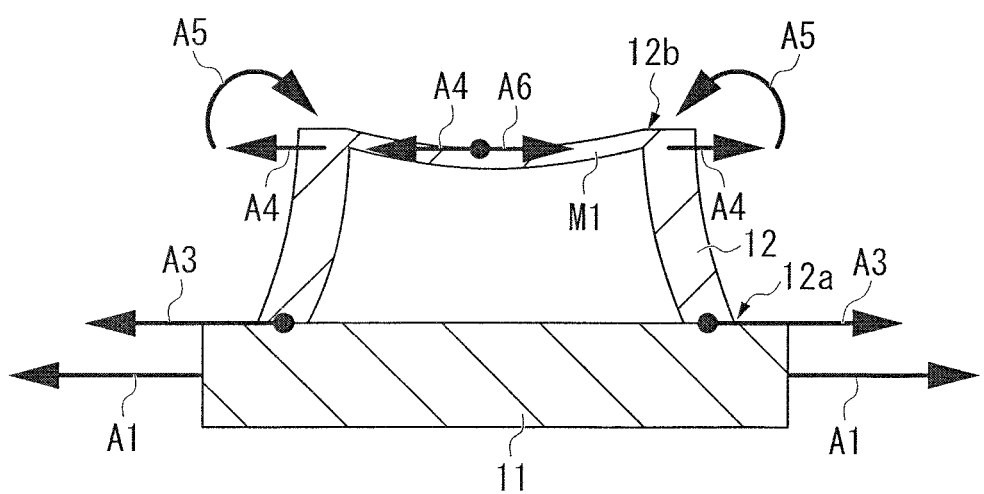
FIG. 2B is a sectional view of the sensor in a first embodiment for describing the strain generated when the temperature of the sensor increases.

FIG. 2A is a plan view of the sensor in a first embodiment for describing the strain generated when the temperature of the sensor increases. FIG. 2B is a sectional view of the sensor in a first embodiment for describing the strain generated when the temperature of the sensor increases. In FIGS. 2A and 2B, illustration of the strain detecting element 13 is omitted. Because the first structure 11, the second structure 12, and the strain detecting element 13 are made of different materials respectively, the thermal expansion coefficients of them are different from each other. Specifically, a thermal expansion coefficient α1 of the first structure 11 which is made of SUS (Steel Use Stainless) is about 16 to 17 [ppm/° C.]. A thermal expansion coefficient α2 of the second structure 12 which is made of ceramics is about 1 to 7.2 [ppm/° C.]. A thermal expansion coefficient α3 of the strain detecting element 13 which is made of semiconductor (silicon) is about 2.46 to 4 [ppm/° C.].

As shown in FIG. 2A, if the temperature of the sensor 1 is increased, the first structure 11, the second structure 12, and the strain detecting element 13 in the sensor 1 are isotropically expanded. For example, as shown by an arrow A1 in FIG. 2A, the first structure 11 is thermally expanded in x direction as much as y direction. As shown by an arrow A2 in FIG. 2A, the second structure 12 is thermally expanded in x direction as much as y direction. Because the first structure 11 is greater in a thermal expansion coefficient than the second structure 12, the first structure 11 thermally expands more greatly than the second structure 12.

Because the end part 12a of the second structure 12 is joined to the upper surface of the first structure 11, as shown by an arrow A3 in the FIG. 2B, the end part 12a expands more greatly than an original expansion affected by the thermal expansion of the first structure 11. On the other hand, although the strain detecting element 13 is joined to the end part 12b, as shown by an arrow A4 in the FIG. 2B, the end part 12b expands almost as much as an original expansion in accordance with the thermal expansion coefficient α2.

As shown by an arrow A5 in FIG. 2B, in the second structure 12, the end part 12a expands more than the end part 12b, and a bending moment is generated around the end part 12b (the upper surface membrane M1). Thereby, the upper surface membrane M1 of the second structure bends downwardly (to a side of the first structure 11). As shown by an arrow A6 in FIG. 2B, a compression strain, which acts in a direction of canceling the thermal expansion of the second structure 12 (the upper surface membrane M1), is generated. In the second structure 12, a tensile strain generated by a difference in thermal expansion coefficient between the first structure 11 and the second structure 12 and a compression strain generated in a joining part of the end part 12b by deformation of the end part 12a of the second structure 12 are canceled each other. Thereby, the shape of the second structure 12 is designed so that a strain, which is generated by the thermal expansion detected by the strain detecting element 13 joined to the end part 12b, is made to be approximately zero.

Figure 3A:
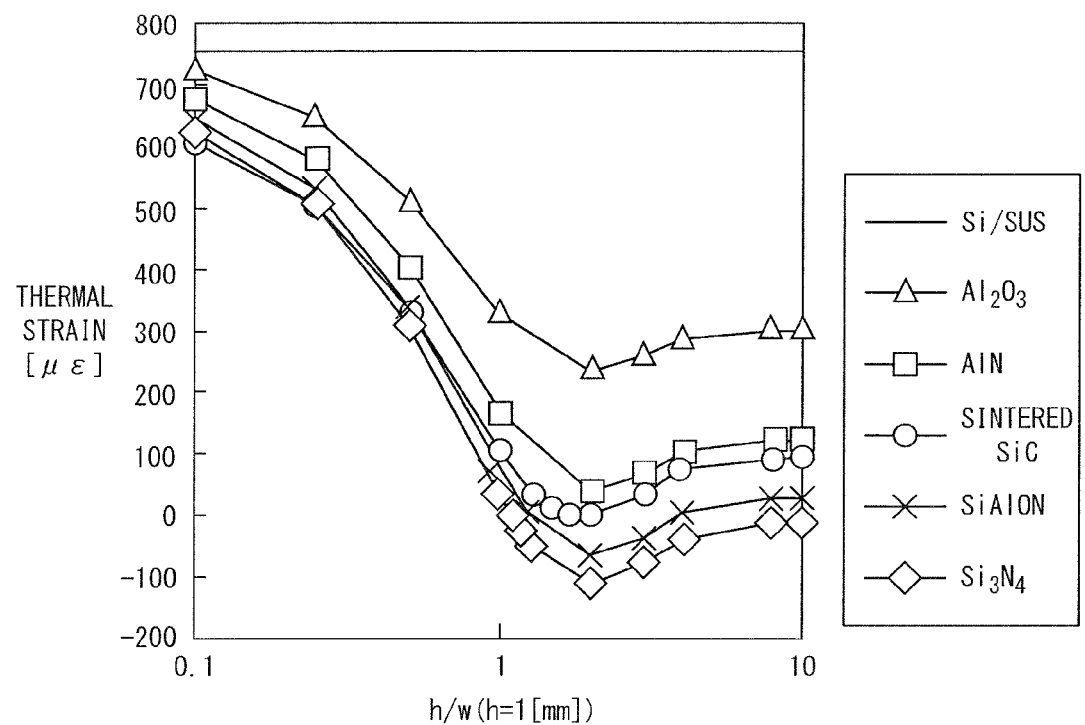
FIG. 3A is a drawing illustrating an experimental result of a relation between a shape of the second structure in the sensor and a thermal strain in the first embodiment.
Figure 3B:
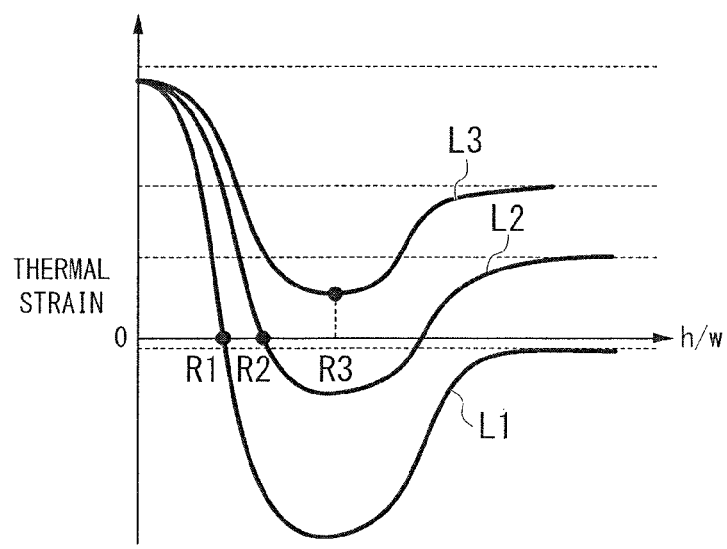
FIG. 3B is a drawing illustrating a classification of the experimental result of FIG. 3A.

FIG. 3A is a drawing illustrating an experimental result of a relation between a shape of the second structure in the sensor and a thermal strain in the first embodiment. FIG. 3B is a drawing illustrating a classification of the experimental result of FIG. 3A. In FIG. 3A, the horizontal axis indicates a ratio (h/w) of the height h to the width w of the side wall, which prescribes the shape of the second structure 12, and the vertical axis indicates a thermal strain generated in the end part 12b of the second structure 12 (an interface between the second structure 12 and the strain detecting element 13) when the temperature is increased from 20 [° C.] to 100 [° C.].

The experimental result shown in FIG. 3A can be obtained by repeatedly conducting an experiment of measuring the thermal strain generated when the temperature is increased from 20 [° C.] to 100 [° C.] with respect to some second structures 12, which are different in a ratio (h/w) of the height h to the width w of the side wall, with material of the second structure 12 changed. However, the width w of the second structure 12 is fixed as 1 [mm]. As the material of the second structure 12, following materials are used. In FIG. 3A, so as to compare, the thermal strain, which is generated in a case that the strain detecting element 13 is directly bonded to the first structure 11, is illustrated (referring to Si/SUS in FIG. 3A).

alumina ($Al_2O_3$) (thermal expansion coefficient: 7.2 [ppm/° C.])

aluminum nitride (AlN) (thermal expansion coefficient: 4.6 [ppm/° C.])

sintered silicon carbide (SiC) (thermal expansion coefficient: 4.1 [ppm/° C.])

sialon (SiAlON) (thermal expansion coefficient: 3.2 [ppm/° C.])

silicon nitride ($Si_3N_4$) (thermal expansion coefficient: 2.6 [ppm/° C.])

Referring to the experimental result shown in FIG. 3A, regardless of material of the second structure 12, there is a following tendency in accordance with the ratio (h/w) of the height h to the width w of the side wall of the second structure 12. That is, in a case that the ratio (h/w) is about 0.1 to 2, the greater the ratio (h/w) is, the smaller the thermal strain is. In a case that the ratio (h/w) is about 2, the thermal strain becomes minimum. In a case that the ratio (h/w) is about 2 to 10, the greater the ratio (h/w) is, the gradually greater the thermal strain is and the thermal strain converges to a certain value.

In a case that the ratio (h/w) is small enough, the rigidity of the side wall of the second structure 12 is high, and an influence of the thermal expansion generated in the first structure 11 is easy to conduct to the end part 12b of the second structure 12. The thermal strain, which is generated in the end part 12b of the second structure 12 in this case, comes close to a thermal strain which is generated by a difference between the thermal expansion coefficients in a case that the first structure 11 and the silicon (the strain detecting element 13) are directly bonded. On the other hand, in the case that the ratio (h/w) is large enough, the rigidity of the side wall of the second structure 12 is low, and an influence of the thermal expansion generated in the first structure 11 is difficult to be conducted to the end part 12b of the second structure 12. The thermal strain, which is generated in the end part 12b of the second structure 12 in this case, converges to a thermal strain which is generated by a difference in thermal expansion coefficient between the second structure 12 and the silicon (the strain detecting element 13).

As shown in FIG. 3B, the experimental result of FIG. 3A is classified into three curves L1 to L3 in accordance with a magnitude of the thermal expansion coefficient of the second structure 12. The curve L1 is a curve in a case that the second structure 12 is made of material (for example, silicon nitride ($Si_3N_4$)) which is smaller in a thermal expansion coefficient than silicon. In the curve L1, there is only one point where the thermal strain is zero (there is only one zero cross point).

The curve L2 is a curve in a case that the second structure 12 is made of material (for example, sintered silicon carbide (SiC) and sialon (SiAlON)) which is approximately the same in a thermal expansion coefficient as silicon. In the curve L2, there are two points where the thermal strain is zero (there are two zero cross points). The curve L3 is a curve in a case that the second structure 12 is made of material (for example, alumina ($Al_2O_3$) and aluminum nitride (AlN)) which is greater in a thermal expansion coefficient than silicon. In the curve L3, there is no point where the thermal strain is zero (there is no zero cross point).

In a case that the second structure 12 is made of material which is smaller in a thermal expansion coefficient than silicon, as shown by the curve L1, there is one zero cross point. Therefore, the ratio (h/w) of the height h to the width w of the side wall is set to a value of the zero cross point (the value R1 in FIG. 3B) so that the strain of the end part 12b, which is generated by the thermal expansions of the first structure 11, the second structure 12, and the strain detecting element 13, becomes zero.

On the other hand, in a case that the second structure 12 is made of material which is approximately the same in a thermal expansion coefficient as silicon, as shown by the curve L2, there are two zero cross points. Therefore, the ratio (h/w) of the height h to the width w of the side wall of the second structure 12 is set to one of values of the two zero cross points so that the strain of the end part 12b, which is generated by the thermal expansions of the first structure 11, the second structure 12, and the strain detecting element 13, becomes zero. However, because the sensitivity of the sensor 1 with respect to the strain of the measurement specimen S is high if the ratio (h/w) is small, the ratio (h/w) of the height h to the width w of the side wall is set to a smallest value (the value R2 in FIG. 3B) of the two zero cross points.

On the other hand, in a case that the second structure 12 is made of material which is greater in a thermal expansion coefficient than silicon, as shown by the curve L3, there is no zero cross point. For the reason, the strain of the end part 12b of the second structure 12, which is generated by the thermal expansions of the first structure 11, the second structure 12, and the strain detecting element 13, cannot become zero. Therefore, the ratio (h/w) of the height h to the width w of the side wall is set to a value (the value R3 in FIG. 3B) in which the strain of the end part 12b, which is generated by the thermal expansions of the first structure 11, the second structure 12, and the strain detecting element 13, is minimum.

Figure 4A:
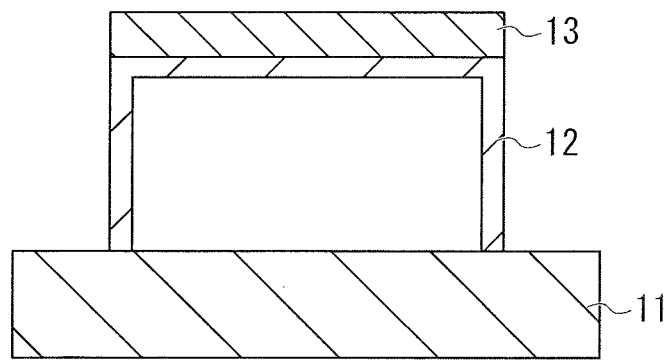
FIG. 4A is a sectional view illustrating an example in a case that the ratio (h/w) is about 10.
Figure 4B:
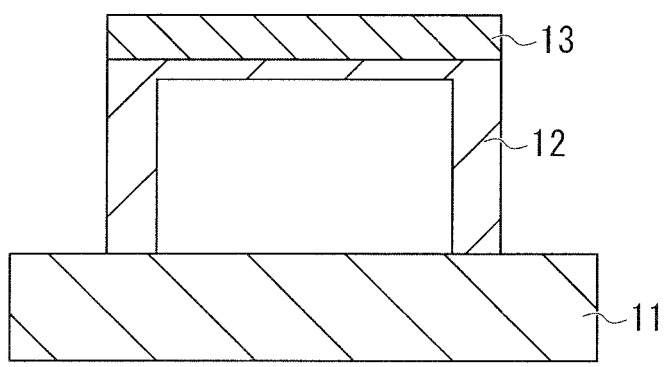
FIG. 4B is a sectional view illustrating an example in a case that the ratio (h/w) is about 3.
Figure 4C:
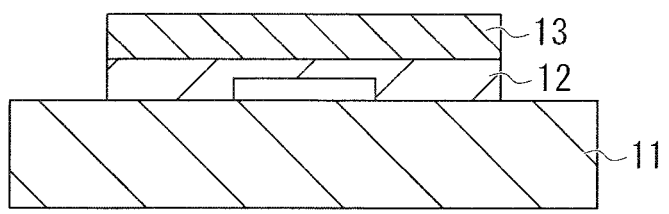
FIG. 4C is a sectional view illustrating an example in a case that the ratio (h/w) is about 0.5.

Summarizing the above, the strain generated by heat depends on the ratio (h/w) and the material of the second structure. If the ratio (h/w) of the second structure is changed, as shown FIGS. 4C, 4B, and 4A, the greater the ratio (h/w) is, the thermal strain becomes smaller, the curves have a minimal value, and the curves are converged to a difference in thermal expansion coefficient between the second structure 12 and the strain detecting element 13.

If the thermal expansion coefficient of the second structure 12 is changed, although the ratio (h/w) of the minimal point is not changed, as shown by L1 to L3 in FIG. 3B, the thermal strain is changed. In a case that the second structure 12 is greater in thermal expansion coefficient than the strain detecting element 13, as shown by the curve L3, there is no intersection point. If the thermal expansion coefficient becomes smaller, the minimal value crosses zero as shown by the curve L2 in FIG. 3B, and finally there is only one intersection point as shown by the curve L1.

Figure 5:
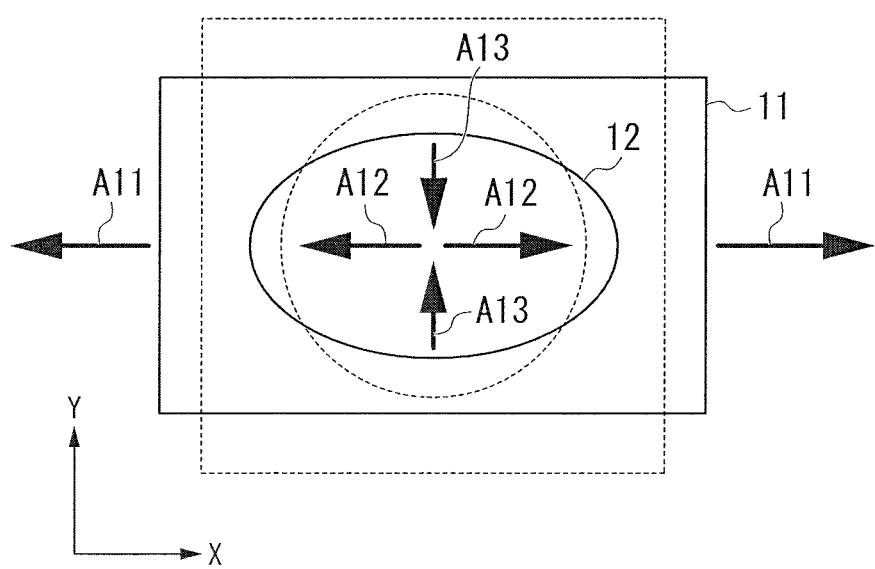
FIG. 5 is a drawing for describing an operation of the sensor in the first embodiment.

Next, the sensor 1 having the configuration will be described simply. FIG. 5 is a drawing for describing an operation of the sensor in the first embodiment. As shown by the arrow A11 in FIG. 5, a tensile stress in the X direction is applied to the measurement specimen S. At this time, the measurement specimen S is pulled in the X direction, a compression force is applied in the Y direction by Poisson's effect, and the measurement specimen S is compressed in the Y direction.

At this time, the first structure 11 joined to the measurement specimen S and the second structure 12 of which end part 12a is joined to the first structure 11 are under a tensile stress (referring to an arrow A12 shown in FIG. 5) by being pulled in the X direction as with the measurement specimen S, and are under a compression stress (referring to an arrow A13 shown in FIG. 5) by being compressed in the Y direction. When the second structure 12 is under the stress, the second structure 12 is deformed as shown in FIG. 5. Thereby, a strain is generated in the end part 12b of the second structure 12 in accordance with the stress acting on the measurement specimen S. The strain generated in the end part 12b of the second structure 12 is detected by the strain detecting element 13 which is connected to the end part 12b of the second structure 12. In this way, the strain according to the stress, which acts on the measurement specimen S, is detected by the sensor 1.

As described above, the sensor 1 in the present embodiment has the first structure 11, the second structure 12, and the strain detecting element 13. The first structure 11 is attached to the measurement specimen S. The second structure 12 is formed to be cylindrical by material which is smaller in a thermal expansion coefficient than the first structure 11, and the end part 12a is joined to the first structure 11. The strain detecting element 13 is joined to the end part 12b of the second structure 12, and the strain detecting element 13 detects the strain in the end part 12b of the second structure 12. In the bonding between the first structure 11 and the second structure 12, and the bonding between the second structure 12 and the strain detecting element 13, by bonding without adhesive, the drift and the hysteresis can be reduced, and a highly reliable measurement can be performed.

If the ratio (h/w) of the height h to the width w of the side wall of the second structure 12 is set so that a strain of the end part 12b of the second structure 12, which is generated by thermal expansions of the first structure 11, the second structure 12, and the strain detecting element 13, is made to be zero, the strain of the end part 12b of the second structure 12, which is generated by a temperature change, is compensated. Thereby, without being affected by the temperature change, a fine strain can be measured in high accuracy.

Second Embodiment

Figure 6:
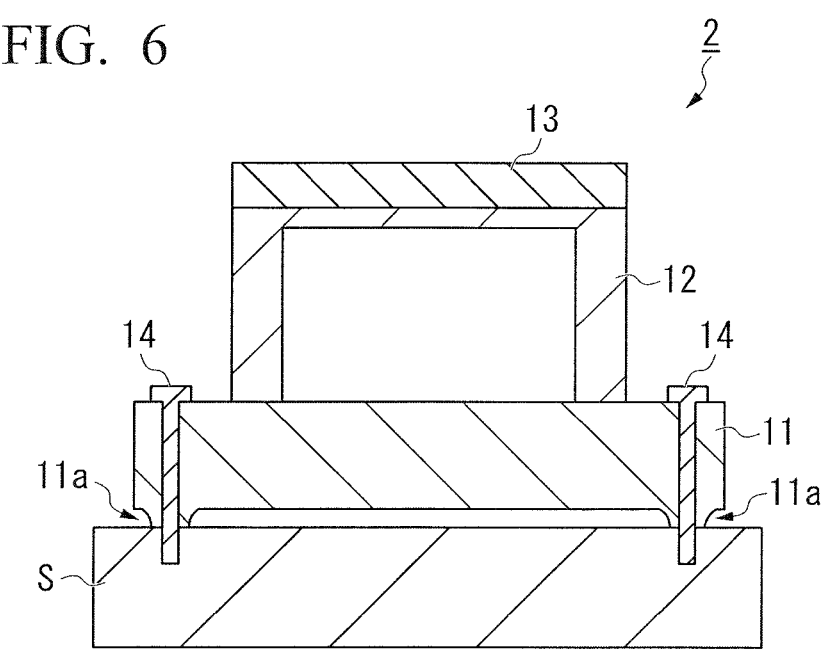
FIG. 6 is a sectional view illustrating a main configuration of a sensor in the second embodiment.

FIG. 6 is a sectional view illustrating a main configuration of a sensor in the second embodiment. In FIG. 6, parts that correspond to those in FIG. 1 are assigned the same reference numerals. As shown in FIG. 6, the sensor 2 in the present embodiment is joined to the measurement specimen S by using a joining member 14 such as a screw, a rivet, or the like.

Specifically, the sensor 2 in the present embodiment has the first structure 11 having a through-hole in which an axis of the joining member 14 is inserted. The sensor 2 is joined to the measurement specimen S by fixing the joining member 14, which is inserted in the through-hole, to a hole formed in the measurement specimen S. In a case that the joining member 14 is a screw, the sensor 2 is fixed by making a leading edge of the joining member 14 screwed in the hole (screw hole) of the measurement specimen S. In a case that the joining member 14 is a rivet, the sensor 2 is fixed by caulking the joining member 14 of which leading end is inserted in the hole of the measurement specimen S.

Foot parts 11a, which project from a back side of the first structure 11, are formed around the through-hole in the back side of the first structure 11. The foot parts 11a are for reducing a friction between the first structure 11 and the measurement specimen S (a friction causing the hysteresis). Therefore, the first structure 11 is joined to the measurement specimen S in a state that only the foot parts are in contact with the measurement specimen S. In this way, in the present embodiment, the first structure 11 is joined to the measurement specimen S by using the joining member 14 such as a screw, a rivet, or the like, so that the friction between the first structure 11 and the measurement specimen S is reduced as much as possible. The shape of the second structure 12 (the height h and the width w of the side wall) is designed by the design method as with the first embodiment.

The sensor 2 in the present embodiment is the same as the sensor 1 in the first embodiment, except that the first structure 11 is joined to the measurement specimen S by using the joining member 14 such as a screw, a rivet, or the like. Therefore, in the present embodiment, the drift and the hysteresis can be reduced and a fine strain can be measured in high accuracy.

Third Embodiment

Figure 7A:
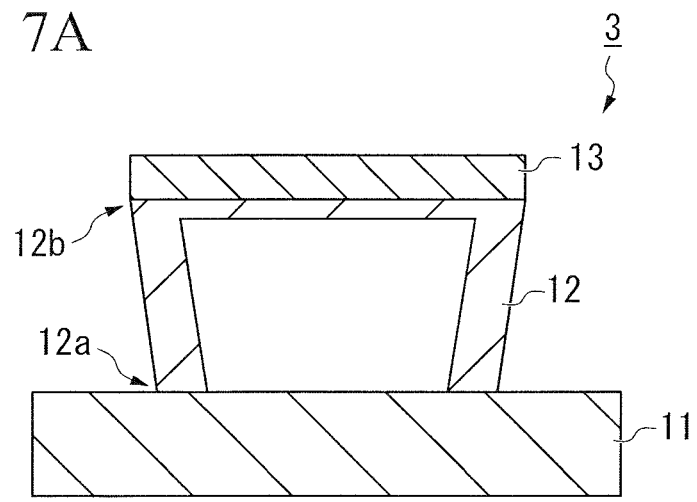
FIG. 7A is a sectional view illustrating a main configuration of a sensor in the third embodiment.
Figure 7B:
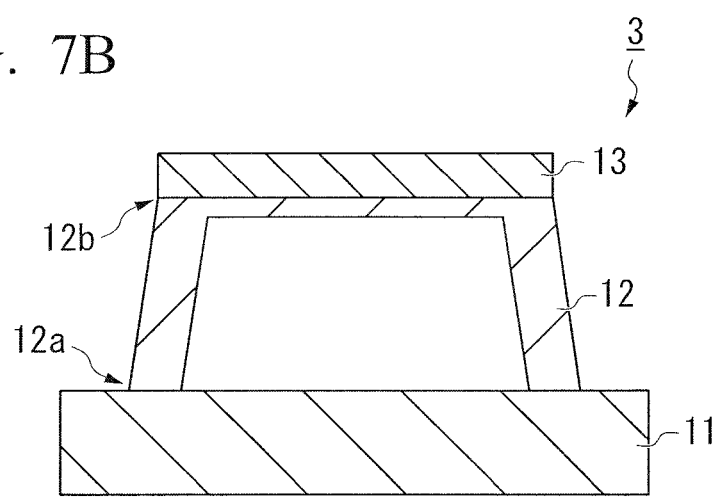
FIG. 7B is a sectional view illustrating a main configuration of a sensor in the third embodiment.

FIG. 7A and FIG. 7B are sectional views illustrating a main configuration of a sensor in the third embodiment. In FIG. 7A and FIG. 7B, parts that correspond to those in FIG. 1 are assigned the same reference numerals. In the first and second embodiments, the side walls of the second structures 12 of the sensors 1 and 2 are vertically joined to the first structure 11. However, in the third embodiment, the side wall of the second structure 12 of the sensor 3 is inclined and joined to the first structure 11.

The second structure 12 of the sensor 3 in the present embodiment is formed so that the width of the end part 12a connected to the first structure 11 and the width of the end part 12b connected to the strain detecting element 13 are different from each other. Specifically, the second structure 12 shown in FIG. 7A is formed so that the higher the position of the side wall is, the larger the internal diameter and the external diameter are. To the contrary, the second structure 12 shown in FIG. 7B is formed so that the lower the position of the side wall is, the larger the internal diameter and the external diameter are. By using the second structure 12, the stress generated in an interface between the first structure 11 and the second structure 12 can be reduced.

Fourth Embodiment

FIG. 8A and FIG. 8B are sectional views illustrating a main configuration of a sensor in the fourth embodiment. In FIG. 8A and FIG. 8B, parts that correspond to those in FIG. 1 are assigned the same reference numerals. In the first to third embodiments, only the end part 12b of the second structure 12 has a bottom. However, in the fourth embodiment, both of the end parts 12a and 12b of the second structure 12 of the sensor 4 have a bottom, or both of the end parts 12a and 12b do not have a bottom.

Specifically, in the second structure 12 shown in FIG. 8A, an upper surface membrane M1 is formed in the end part 12b, and a bottom surface membrane M2 is formed in the end part 12a. In this way, both of the end parts 12a and 12b have a bottom. To the contrary, in the second structure 12 shown in FIG. 8B, both of the upper surface membrane M1 and the bottom surface membrane M2 are not formed in the end parts 12a and 12b. In this way, both of the end parts 12a and 12b do not have a bottom. In a case that both of the end parts 12a and 12b have a bottom, and also, in a case that both of the end parts 12a and 12b do not have a bottom, the effect as with the first and the second embodiments can be obtained.

Fifth Embodiment

Figure 9A:
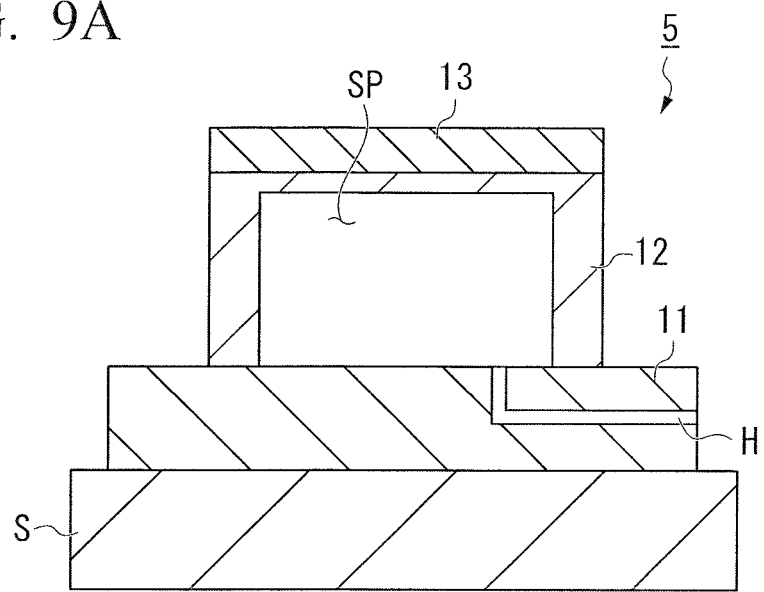
FIG. 9A is a sectional views illustrating a main configuration of a sensor in the fifth embodiment.
Figure 9B:
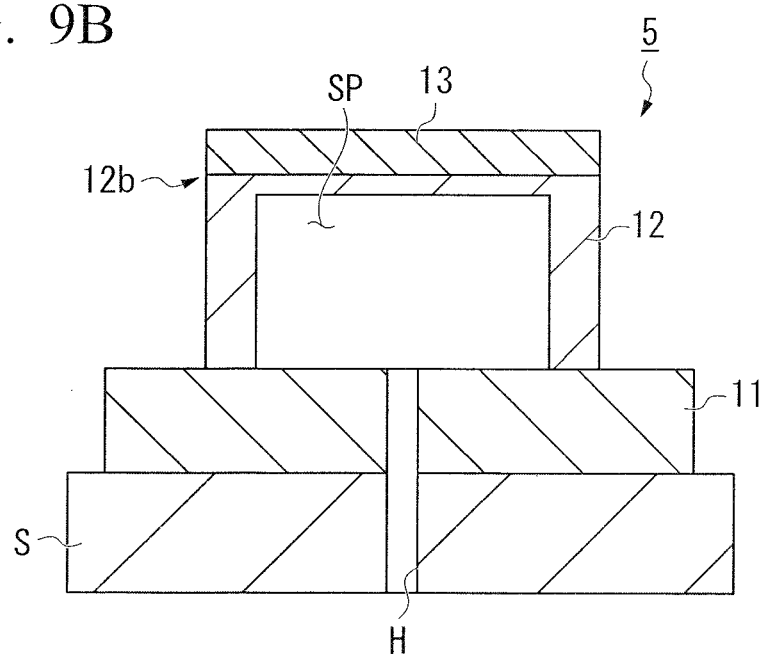
FIG. 9B is a sectional views illustrating a main configuration of a sensor in the fifth embodiment.

FIG. 9A and FIG. 9B are sectional views illustrating a main configuration of a sensor in the fifth embodiment. In FIG. 9A and FIG. 9B, parts that correspond to those in FIG. 1 are assigned the same reference numerals. In the first to fourth embodiments, in a case that a space SP of the second structure 12 is sealed by the first structure 11, when temperature is changed, gas in the space SP is expanded or contracted, the strain is generated in the second structure 12, and measurement error occurs. To the contrary, in the fifth embodiment, by forming a through-hole H, a pressure in the space SP and a pressure out of the sensor 5 can be made equal, and an influence of an atmospheric pressure and temperature can be prevented. In the sensor 5 in the fifth embodiment, the through-hole H communicating with the space SP is formed.

Specifically, in the sensor 5 shown in FIG. 9A, the through-hole H communicating with the space SP is formed in the first structure 11. To the contrary, in the sensor 5 shown in FIG. 9B, the through-hole H communicating with the space SP is formed so as to pass through the first structure 11 and the measurement specimen S. The through-hole H communicating with the space SP may be formed in the second structure 12, may be formed in the strain detecting element 13, or may be formed in a joining part between the first structure 11 and the second structure 12.

Sixth Embodiment

Figure 10:
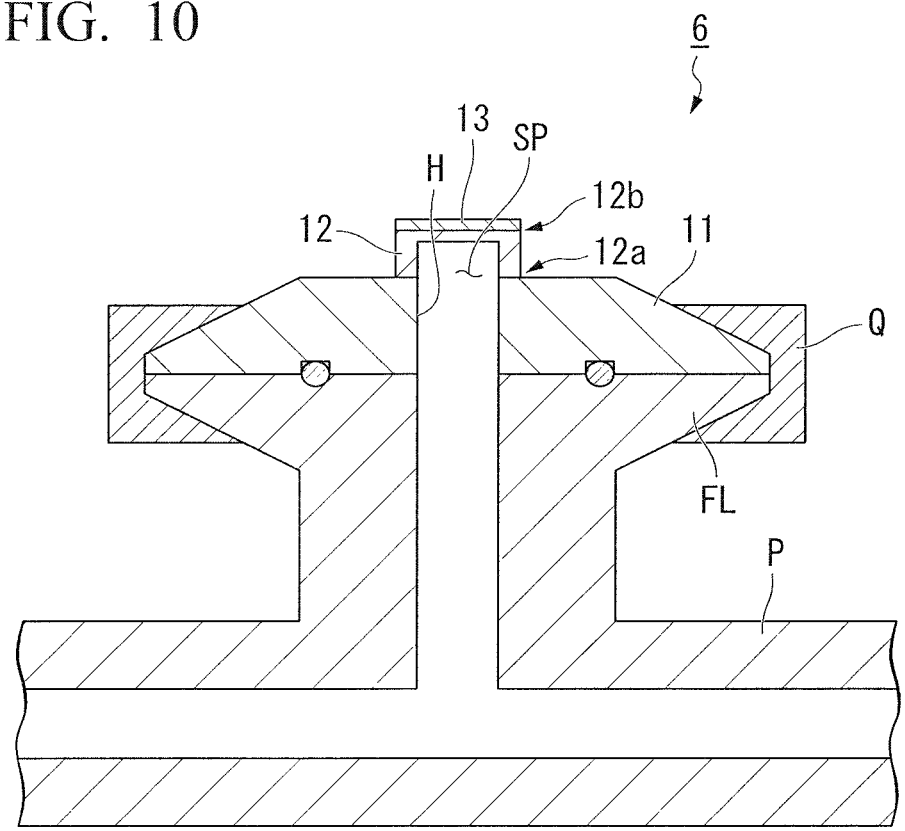
FIG. 10 is a sectional view illustrating a main configuration of a sensor in the sixth embodiment.

FIG. 10 is a sectional view illustrating a main configuration of a sensor in the sixth embodiment. In FIG. 10, parts that correspond to those in FIG. 1 are assigned the same reference numerals. The sensor 6 in FIG. 10 can be used for measuring a pressure of fluid. In the sensor 6, the first structure 11 is fixed, by a coupler Q, to a flange FL of a branch flow path connected to a pipe P which is a flow path of fluid, and the fluid flows into the space SP via the through-hole H. The strain detecting element 13 detects a strain generated in the end part 12*b* of the second structure 12 in accordance with a pressure of the fluid flowing into the space SP, so that the pressure of the fluid can be measured. Because the second structure 12 is designed by the design method as with the first embodiment, an influence of a thermal expansion generated in the pipe P of the fluid can be removed.

Although a sensor according to embodiments of the present invention has been described above, the present invention is not restricted to the above-described embodiments, and can be freely modified within the scope thereof. For example, although the foregoing descriptions of the embodiments have been examples in which the second structure 12 has a bottomed cylindrical shape, the shape of the second structure 12 and the shape of the strain detecting element 13 may be an arbitrary shape.

Figure 11E:
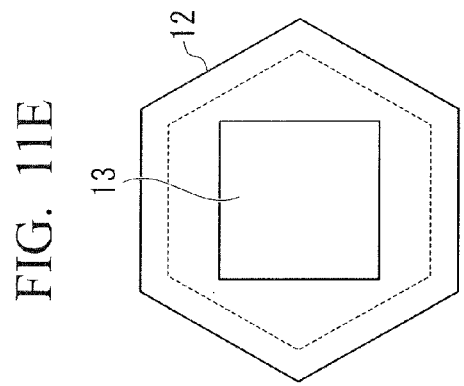
FIG. 11E is a drawing illustrating an example of a dimension of the second structure and a shape of the strain detecting element.
Figure 11F:
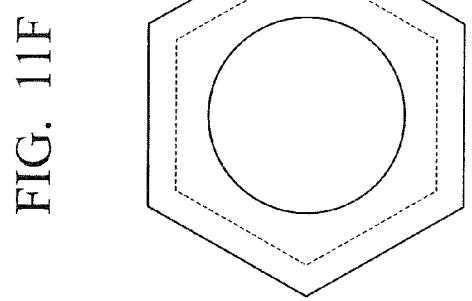
FIG. 11F is a drawing illustrating an example of a dimension of the second structure and a shape of the strain detecting element.
Figure 11C:
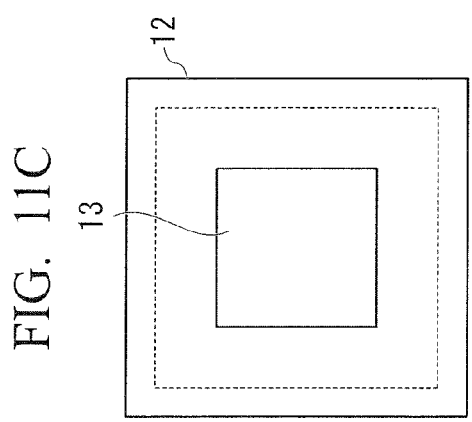
FIG. 11C is a drawing illustrating an example of a dimension of the second structure and a shape of the strain detecting element.
Figure 11D:
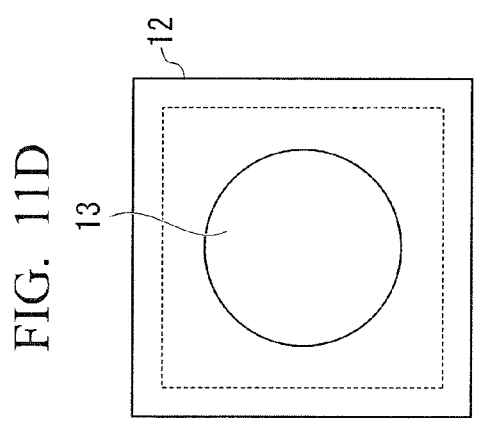
FIG. 11D is a drawing illustrating an example of a dimension of the second structure and a shape of the strain detecting element.
Figure 11A:
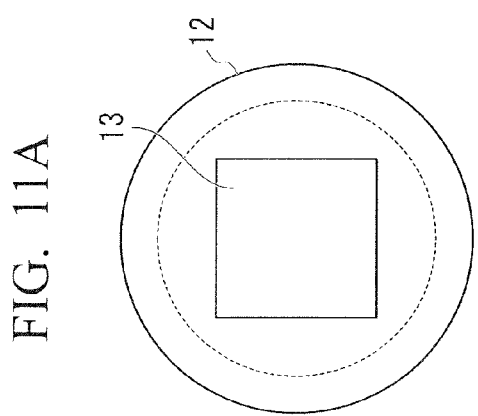
FIG. 11A is a drawing illustrating an example of a dimension of the second structure and a shape of the strain detecting element.
Figure 11B:
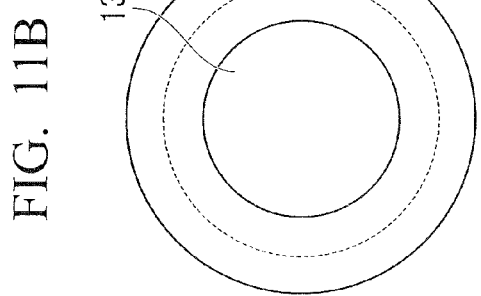
FIG. 11B is a drawing illustrating an example of a dimension of the second structure and a shape of the strain detecting element.

FIG. 11A to FIG. 11F are drawings illustrating examples of a dimension of the second structure and a shape of the strain detecting element. The second structure 12 may have a cylindrical shape as shown in FIG. 11A and FIG. 11B, may have a square cylindrical shape as shown in FIG. 11C and FIG. 11D, and may have a hexagonal cylindrical shape as shown in FIG. 11E and FIG. 11F. The second structure 12 may have a columnar shape or a rectangular columnar shape, and may have a truncated cone shape or a truncated pyramid shape.

Next, the strain detecting element 13 may have a rectangular shape as shown in FIG. A, FIG. C, and FIG. E, and may have a circular shape as shown in FIG. B, FIG. D, and FIG. F. A size of the strain detecting element 13 in a plan view is arbitrary. For example, as show in FIG. 11B and FIG. 11C, in a case that the shape of the strain detecting element 13 in a plan view is the same as the shape of the second structure 12 in a plan view, the strain detecting element 13 may be made equal in a size to the second structure 12, and may be made smaller in a size than the second structure 12.

Figure 12A:
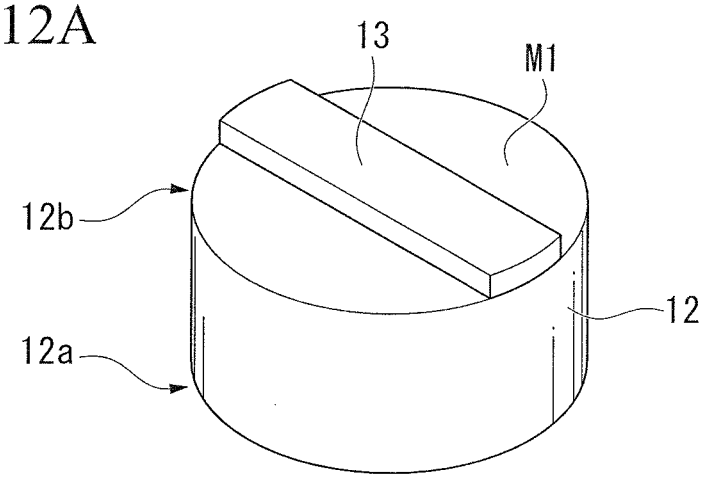
FIG. 12A is a drawing illustrating an example of a connection of the strain detecting element in a case that the upper surface membrane M1 is formed over the end part 12b of the second structure 12.
Figure 12B:
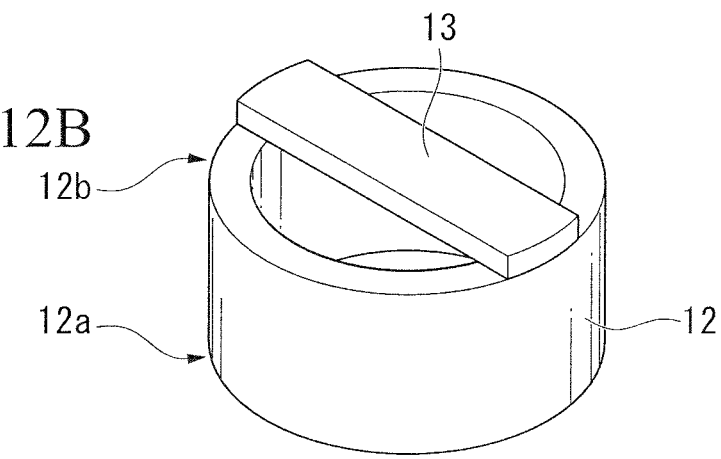
FIG. 12B is a drawing illustrating an example of a connection of the strain detecting element in a case that the upper surface membrane M1 is not formed over the end part 12b of the second structure 12.

The strain detecting element 13 is not necessarily connected to an entire of the end part 12*b*, and the strain detecting element 13 may be connected to only a part of the end part 12*b*. FIG. 12A is a drawing illustrating an example of a connection of the strain detecting element in a case that the upper surface membrane M1 is formed over the end part 12*b* of the second structure 12. FIG. 12B is a drawing illustrating an example of a connection of the strain detecting element in a case that the upper surface membrane M1 is not formed over the end part 12*b* of the second structure 12.

As shown in FIG. 12A, in a case that the upper surface membrane M1 is formed over the end part 12*b* of the second structure 12, for example, the rectangular shaped strain detecting element 13 is connected to the upper surface membrane M1 so as to be disposed in a center of the upper surface membrane M1. As shown in FIG. 12B, in a case that the upper surface membrane M1 is not formed over the end part 12*b* of the second structure 12, for example, the rectangular shaped strain detecting element 13 is connected to the end part 12*b* of the second structure 12 so as to be bridged in a diameter direction.

As described above, in a case that the strain detecting element 13 is connected to only a part of the end part 12*b* of the second structure 12, the strain detecting element 13 is easily deformed, in comparison with the case that the strain detecting element 13 is connected to an entire of the end part 12*b*. Therefore, a detection sensitivity of the strain detecting element 13 can be improved.

In the embodiments, although the measurement specimen S is made of SUS (Steel Use Stainless), the measurement specimen S may be made of concrete. In a case that the measurement specimen S is made of concrete, the first structure 11 is also made of concrete, and the first structure 11 and the measurement specimen S are joined by using concrete.

In the embodiments, although the strain detecting element 13 has a resonant strain gauge, the strain detecting element 13 may have a semiconductor strain gauge, or may have both of a semiconductor strain gauge and a resonant strain gauge.

In the embodiments, the three members of the first structure 11, the second structure 12, and the strain detecting element 13 are joined in all of the sensors 1 to 6. However, another member may be joined between the first structure 11 and the second structure 12 or between the second structure 12 and the strain detecting element 13.

As used herein, the following directional terms "forward, rearward, above, downward, right, left, vertical, horizontal, below, transverse, row, column, upper, and bottom" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A strain sensor comprising:
   a first structure that is attached to a measurement specimen;
   a second structure that is made of material which is smaller in thermal expansion coefficient than the first structure, a bottom surface of the second structure being annularly connected to the first structure; and
   a strain detector that is connected to an upper surface of the second structure, the strain detector being configured to detect a strain of the second structure,
   wherein the strain detector is configured to detect a strain in accordance with a stress acting on the measurement specimen.

2. The strain sensor according to claim 1,
   wherein the strain detector is further configured to measure strains of the second structure in directions perpendicular to each other; and wherein a shape of the second structure is configured such that a strain of an outer end part of the second structure is zero.

3. The strain sensor according to claim 1, wherein
the second structure has a space, and
the second structure is any one of a columnar shape, a rectangular columnar shape, a truncated cone shape, and a truncated pyramid shape.

4. The strain sensor according to claim 1, wherein
a connection between the bottom surface of the second structure and the first structure is joined by any one of brazing, inorganic adhesive, glass frit bonding, SOG (Spin On Glass) wafer bonding, and welding.

5. The strain sensor according to claim 1, wherein
a connection between the upper surface of the second structure and the strain detector is joined by any one of inorganic adhesive, glass frit bonding, SOG wafer bonding, anodic bonding, metal diffusion bonding, and surface activated room temperature bonding.

6. The strain sensor according to claim 1, wherein
only a part of the upper surface of the second structure is connected to the strain detector.

7. The strain sensor according to claim 1, wherein
the first structure has a thermal expansion coefficient equivalent to a thermal expansion coefficient of the measurement specimen.

8. The strain sensor according to claim 6, wherein
whole of a bottom surface of the first structure is joined to the measurement specimen.

9. The strain sensor according to claim 6, wherein
the first structure comprises a foot part disposed on a surface facing the measurement specimen, and
the foot part and the measurement specimen are joined.

10. The strain sensor according to claim 1, wherein
the strain detector comprises one of a semiconductor strain gauge and a resonant strain gauge.

11. The strain sensor according to claim 3, wherein
any one of the first structure, the second structure, and strain detector has a through hole communicating to the space of the second structure.

12. The strain sensor according to claim 1, wherein
a width of the bottom surface of the second structure connected to the first structure and a width of the upper surface of the second structure connected to the strain detector are different from each other.

13. The strain sensor according to claim 1, wherein
the first structure is a substrate attached to the measurement specimen, and
the second structure is an intermediate structure disposed between the first structure and the strain detector.

14. The strain sensor according to claim 1, wherein the strain detector comprises two strain gauges configured to measure strains of the second structure, wherein the strain gauges measure strains of the second structure in directions perpendicular to each other.

15. The strain sensor according to claim 14, wherein the two strain gauges can be resonant strain gauges, semiconductor strain gauges, or a resonant strain gauge and a semiconductor strain gauge.

16. The strain sensor according to claim 1, wherein the strain detector is further configured to detect a strain of an end part of the second structure.

17. The strain sensor according to claim 16, wherein the strain of the end part being generated by the strain of the measurement specimen.

18. The strain sensor according to claim 1, wherein a shape of the second structure is configured such that a strain of an outer end part of the second structure is zero.

* * * * *